Patented Aug. 18, 1931

1,819,082

UNITED STATES PATENT OFFICE

WILHELM ECKERT, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

NITROGEN-CONTAINING VAT DYESTUFFS OF THE NAPHTHOYLENE-DIARYLIMIDAZOL SERIES AND PROCESS OF PREPARING THEM

No Drawing. Application filed October 3, 1929, Serial No. 397,156, and in Germany October 22, 1928.

The present invention relates to nitrogen-containing vat dyestuffs of the naphthoylene-diaryl-imidazol series and to a process of preparing them.

In U. S. patent specification No. 1,588,451, dated June 15, 1926, granted to Wilhelm Eckert and Heinrich Greune and in U. S. patent specification No. 1,690,775, dated November 6, 1928, granted to Wilhelm Eckert and in the co-pending U. S. Patent No. 1,765,662 dated June 24, 1930, in the name of Wilhelm Eckert and Heinrich Greune, new vat dyestuffs have been described which are obtained by condensing the dianhydride of the 1.4.5.8-naphthalene-tetra-carboxylic acid or the acid itself with an ortho-diamine or the salts thereof in the presence or absence of a solvent or diluent. The said new dyestuffs correspond to the following formula:

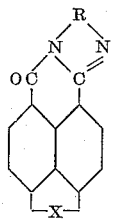

wherein X stands for the bivalent residue:

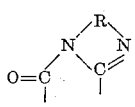

and R for a substituted or unsubstituted arylene group; they are called naphthoylene-di-arylimidazols.

I have found that new valuable dyestuffs and intermediate products are obtained by treating the dyestuffs of the above given formula with a nitrating agent. As nitrating agents there may be used in this process nitric acid, nitrating acid (mixture of nitric acid and sulfuric acid) or the like. The reaction may be carried out both without application of any solvent and in the presence of an organic or inorganic solvent such, for instance, as concentrated sulfuric acid, nitrobenzene or the like. According to my present invention there are obtained mono- or poly-nitro-derivatives according to the conditions used.

The new products correspond to the following formula:

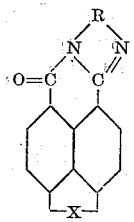

wherein X stands for the bivalent residue:

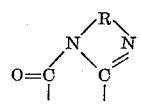

and R for a substituted or unsubstituted bivalent aromatic residue, at least one of the residues standing for R containing the group $NO_2$, the position of which is undetermined, the said products being coloring matter are converted into the corresponding amino compounds when treated with a reducing agent such, for instance, as sodium sulfide. When conducting the reaction by means of a vatting agent. Such, for instance, as hydrosulfite and alkali, the nitro derivatives forms a vat while simultaneously being reduced into the corresponding amino compound. The said amino compounds may, of course, also be isolated and as such transformed into a vat. The amino derivatives can be transformed into further derivatives by means of Sandmeyer's reaction.

The following examples serve to illustrate my invention but they are not intended to limit it thereto, the parts being by weight unless otherwise stated:

1. 10 parts of 1.4.5.8-naphthoylene-dibenzimidazol of one of the following formulæ:

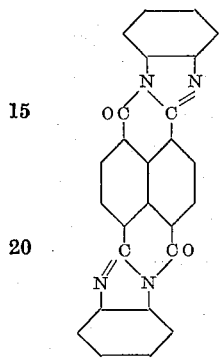

obtainable according to the process of U. S. patent specification No. 1,588,451, above mentioned, by condensing 1.4.5.8-naphthalene-tetra-carboxylic acid with ortho-phenylene-diamine, are heated for some hours to boiling temperature in 150 parts by volume of nitrobenzene with 10 parts of nitric acid, of specific gravity 1.5. After cooling the dyestuff is filtered by suction, washed with alcohol and dried. It probably constitutes a mono-nitroproduct of one of the following formulæ:

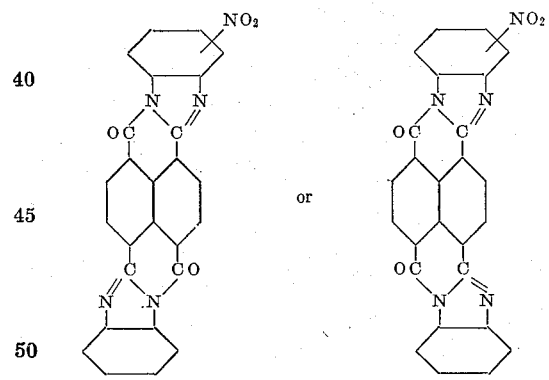

and forms a brownish-red powder which dissolves in concentrated sulfuric acid and concentrated hydrochloric acid to a yellow and in a high-boiling organic solvent to a yellowish-brown solution. When treating this nitro derivative at about 60° C. to 70° C. with hydrosulfite in alkaline suspension or when boiling it with a sodium sulfide solution the corresponding amino derivative is obtained. Whilst the unnitrated starting material dyes cotton from a green vat scarlet tints, the resulting mono-nitro product dyes cotton from a green vat bluish-gray to black shades while simultaneously being reduced into the corresponding amino dyestuff.

The nitration may also be effected in concentrated sulfuric acid at a temperature of from 0° C. to 5° C.

2. 25 parts of 1.4.5.8-naphthoylene-4'.4''-diethoxy-dibenzimidazol of one of the following formulæ:

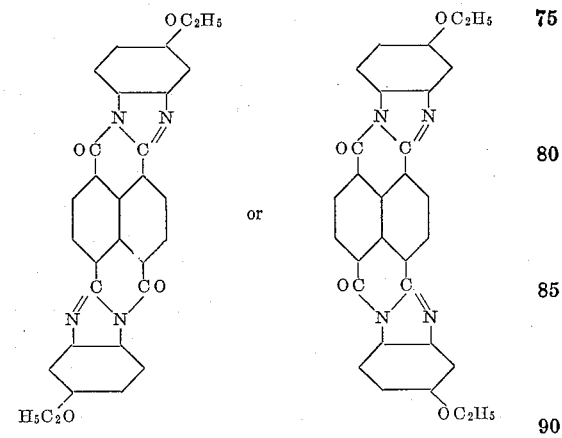

obtainable according to the process of the above mentioned U. S. patent specifications by condensing 1.4.5.8-naphthalene-tetra-carboxylic acid with 4-ethoxy-phenylene-diamine, are dissolved in about 300 parts of concentrated sulfuric acid, whereupon 8 parts of nitric acid of specific gravity 1.48 are gradually introduced at a temperature of from 0° C. to 5° C., while stirring. The nitration being complete, the mass is poured on ice, the dyestuff is filtered by suction, washed until neutral and dried. The product thus obtained forms a dinitro derivative of one of the following formulæ:

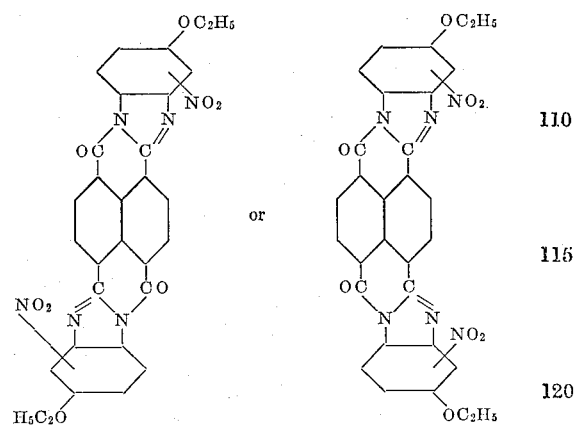

and dyes cotton from a green vat gray tints whereas the unnitrated starting material dyes cotton from a green vat deep violet-brown tints.

The nitration may be carried out with the same result both in an organic solvent or diluent and without them.

3. 5 parts of 1.4.5.8-naphthoylene-1'.2'-

1″.2″-dinaphthimidazol of one of the following probable formulæ:

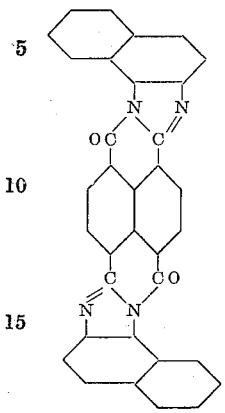 or 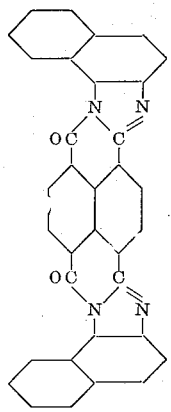

obtainable according to U. S. patent specification No. 1,588,451, above mentioned, by condensing 1.4.5.8-naphthalene-tetra-carboxylic acid with 1.2-naphthylene-diamine, are dissolved in 50 parts of concentrated sulfuric acid whereupon, at 0° C. to 5° C., a mixture of 1.8 parts of nitric acid of specific gravity 1.48 and 20 parts of sulfuric acid is added drop by drop; stirring is continued at this temperature for a short time and the mass is then poured on ice. The precipitated dyestuff is filtered by suction, washed until neutral and dried. It forms a brown powder of one of the following probable formulæ:

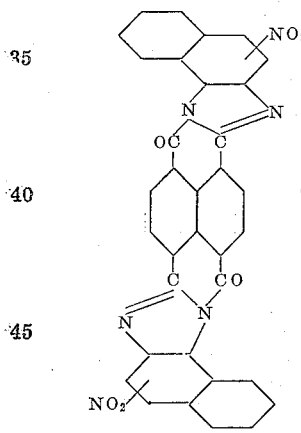 or 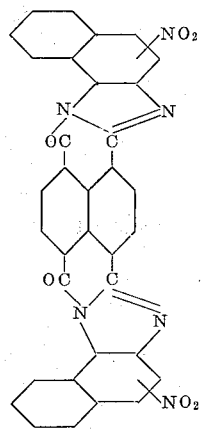

which is almost insoluble in a low-boiling organic solvent, but dissolves in concentrated sulfuric acid to a deep red and in a high-boiling organic solvent such, for instance, as nitrobenzene or the like to a brown solution. When heated to 300° C. the product will not be fused.

When heating the nitration product for some time to boiling temperature with a sodium sulfide solution or when treating it at between 60° C. and 70° C. with hydrosulfite in an alkaline suspension, the corresponding amino compound is obtained which dissolves in form of its leuco compound from which solution cotton is dyed olive-green tints whilst the unnitrated starting material dyes cotton from a greenish-brown vat corinth tints.

The nitration may also be carried out in an organic solvent such, for instance, as nitrobenzene or the like.

4. 41.2 parts of 1.4.5.8-naphthoylene-dibenzimidazol (cf. Example 1) are treated in a ball mill for about 24 hours with 500 parts by volume of nitric acid, specific gravity 1.5. Thereupon the mass is diluted with water, the precipitated product is filtered by suction, washed until neutral and dried. It forms a brownish-red powder which dissolves in concentrated sulfuric acid to a yellow solution; from the results of analysis there may be concluded the product to be a 1.4.5.8-naphthoylene-mono-nitro-dibenzimidazol. It dyes cotton from a green vat grayish-black to black tints; when chlorinating the dyed material the shade turns brown. It is identical with the product obtained according to Example 1.

I claim:

1. The process which comprises treating a compound of the following formula:

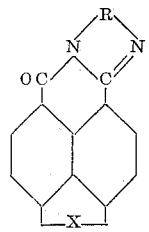

wherein X stands for the bivalent residue

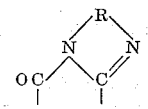

and R for substituted or unsubstituted bivalent aromatic residue, with a nitrating agent.

2. The process which comprises treating a compound of the following formula:

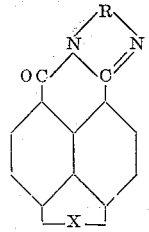

wherein X stands for the bivalent residue

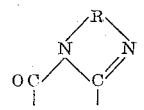

and R for a substituted or unsubstituted bivalent aromatic residue, with a nitrating agent in the presence of a diluent.

3. The process which comprises treating a compound of the following formula:

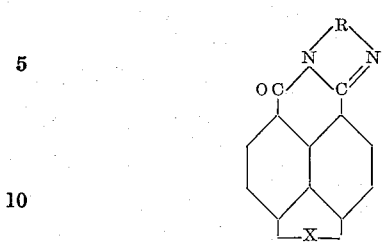

wherein X stands for the bivalent residue

and R for a substituted or unsubstituted phenylene residue, with a nitrating agent.

4. The process which comprises treating a compound of the following formula:

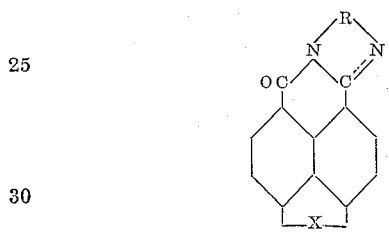

wherein X stands for the bivalent residue

and R for a substituted or unsubstituted phenylene residue, with a nitrating agent in the presence of a diluent.

5. The process which comprises treating a compound of the following formula:

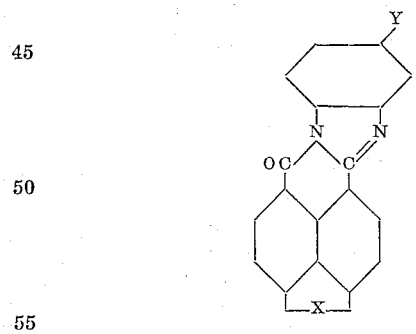

wherein X stands for the bivalent residue

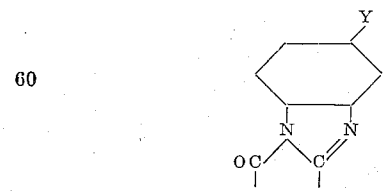

and Y for an alkoxy group, with nitric acid.

6. The process which comprises treating a compound of the following formula:

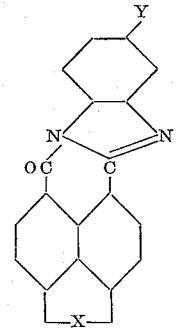

wherein X stands for the bivalent residue

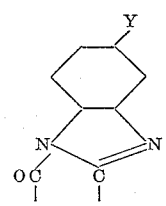

and Y for an alkoxy group, with nitric acid in the presence of a diluent.

7. The process which comprises treating a compound of the following formula:

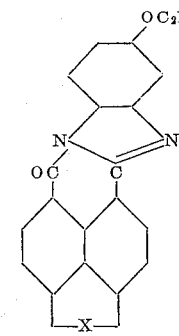

wherein X stands for the bivalent residue

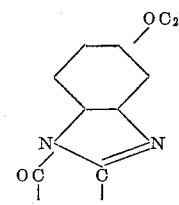

with nitric acid.

8. The process which comprises treating a compound of the following formula:

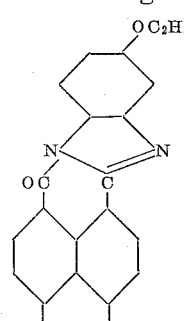

wherein X stands for the bivalent residue

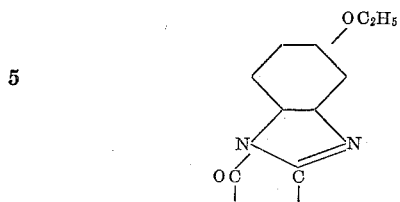

with nitric acid of specific gravity 1.48 in the presence of concentrated sulfuric acid.

9. As new products, compounds of the following general formula:

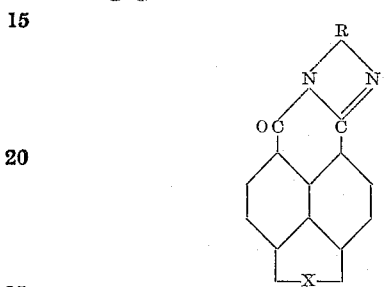

wherein X stands for the bivalent residue

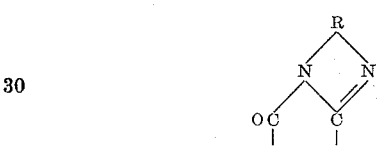

and R for a substituted or unsubstituted bivalent aromatic residue, at least one of the residues designated by R containing the $NO_2$ group, the position of which is undetermined, which products being coloring matter yield when treated with hydrosulfite and alkali a vat, the nitro group being reduced into the amino group.

10. As new products, the compounds of the following formula:

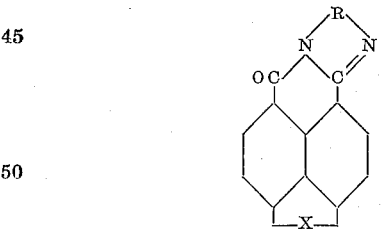

wherein X stands for the bivalent residue

and R for a substituted or unsubstituted phenylene residue, at least one of the residues designated by R containing the $NO_2$ group, the position of which is undetermined, which products being coloring matter yield when treated with hydrosulfite and alkali a vat, the nitro group being reduced into the amino group.

11. As new products, the compounds of the following formula:

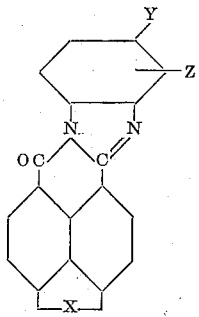

wherein X stands for the bivalent residue

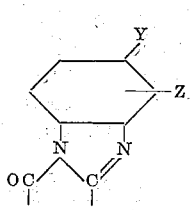

and Y for hydrogen or an alkoxy group and Z for hydrogen or a nitro group, at least one Z being a nitro group, which products being coloring matter yield when treated with hydrosulfite and alkali a vat, the nitro group being reduced into the amino group.

12. As a new product, the 1.4.5.8-naphthoylene-dinitro-4'.4''-diethoxy-dibenzimidazol of one of the following probable formulæ:

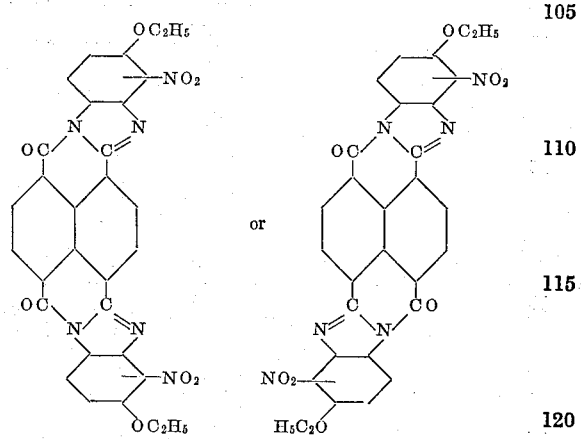

being an orange powder which dissolves in concentrated sulfuric acid and in an organic solvent to a yellowish-red solution, melting at above 300° C. and yielding with hydrosulfite and alkali a green vat, the nitro groups being reduced into the amino groups, from which vat cotton is dyed gray tints.

13. As a new product the 1.4.5.8-naphthoylene-dinitro-1′2′-1″2″-dinaphthimidazol of one of the following probable formulæ:

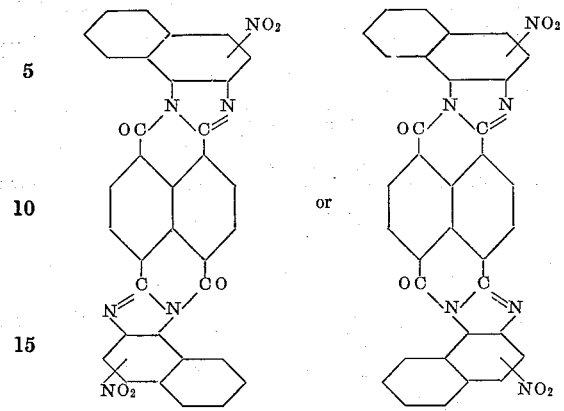

being a brown powder which dissolves in concentrated sulfuric acid to a deep red solution and in a high boiling organic solvent to a brown solution melting at above 300° C. and yielding with hydrosulfite and alkali a vat, the nitro groups being reduced into the amino groups, from which vat cotton is dyed olive-green tints.

In testimony whereof, I affix my signature.
WILHELM ECKERT.